C. T. ALLCUTT.
MEASURING DEVICE.
APPLICATION FILED FEB. 4, 1918.
1,390,743.
Patented Sept. 13, 1921.
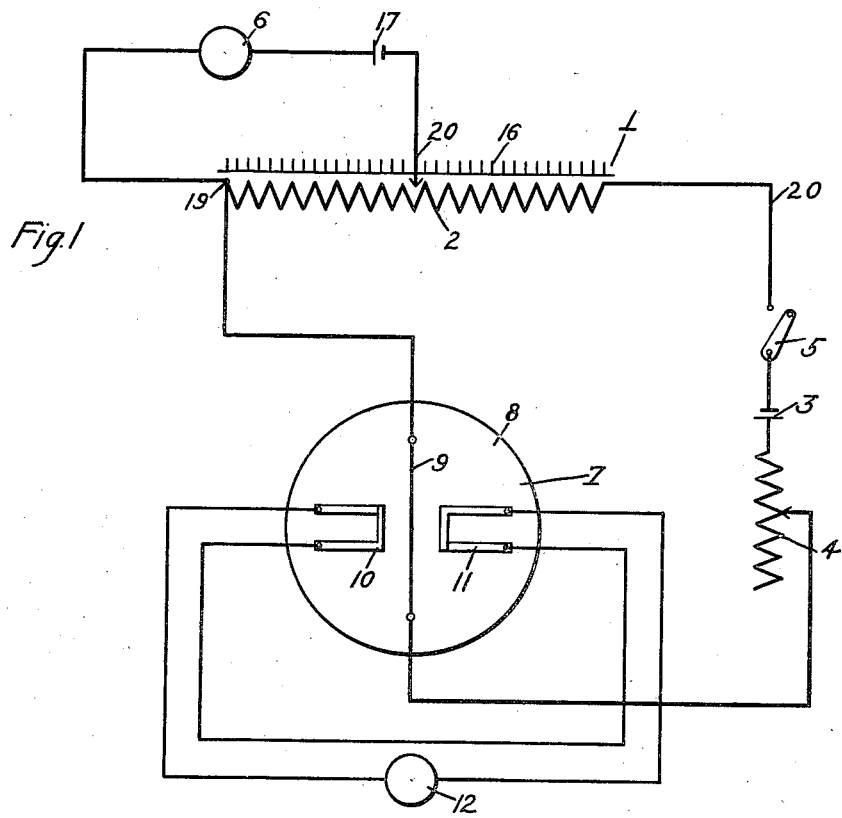
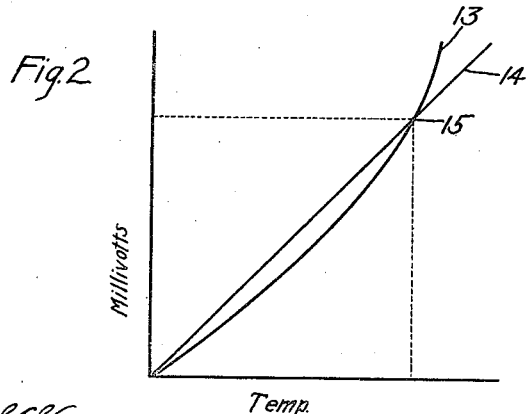
WITNESSES:
INVENTOR
Chester T. Allcutt
BY
ATTORNEY

UNITED STATES PATENT OFFICE.

CHESTER T. ALLCUTT, OF WILKINSBURG, PENNSYLVANIA, ASSIGNOR TO WESTINGHOUSE ELECTRIC & MANUFACTURING COMPANY, A CORPORATION OF PENNSYLVANIA.

MEASURING DEVICE.

1,390,743.  Specification of Letters Patent.  Patented Sept. 13, 1921.

Application filed February 4, 1918. Serial No. 215,381.

*To all whom it may concern:*

Be it known that I, CHESTER T. ALLCUTT, a citizen of the United States, and a resident of Wilkinsburg, in the county of Allegheny and State of Pennsylvania, have invented a new and useful Improvement in Measuring Devices, of which the following is a specification.

My invention relates to measuring devices and particularly to methods of, and means for, determining when a predetermined current traverses a circuit.

One object of my invention is to provide a standard of electromotive force for potentiometers and other similar measuring instruments that shall be accurate and efficient under all conditions of operation.

Another object of my invention is to provide a standard of electromotive force that shall be inexpensive to construct and that shall not deteriorate when current is taken therefrom.

In practising my invention, I provide an air-evacuated receptacle, a heater member traversed by the current to be determined, two thermo-couples having different characteristics and a galvanometer for indicating when the thermo-couples develop equal thermal electromotive forces. By this arrangement, since the characteristic curves of the thermo couples are known and are different, they will generate equal electromotive forces only when the thermo couples are subjected to a predetermined temperature and, consequently, only when a predetermined value of current traverses the heater member.

In the accompanying drawings, Figure 1 is a diagrammatic view of a measuring instrument embodying my invention, and Fig. 2 is a diagram illustrating the characteristic curves of the thermo-couples embodied in my invention.

A potentiometer 1 comprises a potentiometer conductor 2, a source 3 of electromotive force, a resistor 4, a switch 5, a galvanometer 6 and a standard of electromotive force 7. Heretofore, it has been the practice to calibrate the potentiometer conductor 2 by comparing the drop in potential thereof to the electromotive force of a standard cell. However, if current is taken from the standard cell, it deteriorates and its voltage changes, thereby rendering the calibration of the conductor 2 inaccurate.

The standard of electromotive force 7 comprises an air-evacuated receptacle 8, a conductor or heater member 9 that is adapted to be heated by the current from a source 3 of electromotive force, two thermo-couples 10 and 11 having different characteristics and a galvanometer 12 that is connected in series with the thermo couples 10 and 11. The conductor 9 and the thermo-couples 10 and 11 are disposed in the receptacle 8 and are so arranged that the thermo-couples will be heated in accordance with the current traversing the conductor.

In the diagram of Fig. 2, curve 13 represents a characteristic curve of one of the thermo-couples, and curve 14 the characteristic curve of the other thermo-couple. The characteristics of the thermo-couples 10 and 11 are different and such that, when they are heated to a predetermined temperature, they will develop equal thermal electromotive forces, as illustrated by point 15 on curves 13 and 14. Thus, when the galvanometer 12 does not deflect, this indicates that a predetermined current is traversing the conductor 9. The resistor 4 is provided for so adjusting the current traversing the conductor 9 that the galvanometer 12 may indicate when the predetermined desired current is traversing the conductor 2.

Since the current traversing the conductor 2 that causes the galvanometer 12 to indicate no deflection is known, the scale 16 of the potentiometer may be calibrated to indicate directly. Thus, if it is desirable to determine the electromotive force of a source 17 of electromotive force, it is connected in series with the galvanometer 6, and one terminal of the circuit, thus constituted, is connected to the terminal 19 of the conductor 2 and the other terminal is provided with a contact member 20 for engaging the conductor 2. If the contact member 20 is moved along the conductor 2 until the galvanometer 6 indicates no deflection, the position of the contact member 20, with respect to the scale 16, is a direct indication of the electromotive force of the battery or other device 17 the electromotive force of which was to be determined.

My invention is not limited to the specific structure illustrated, as various modifications may be made therein without departing from the spirit and scope of the invention as set forth in the appended claims.

I claim as my invention:

1. A standard measuring device comprising a heater responsive to current, two dissimilar thermo couples subjected to the heater and a galvanometer connected in series with the thermo couples to determine when the couples develop equal thermal electromotive forces.

2. A measuring device comprising a conductor adapted to be heated by an electric current, two thermo couples of different characteristics disposed adjacent the conductor and an indicating instrument connected in circuit with the thermo couples to determine when they develop equal thermal electromotive forces.

3. A measuring device comprising two thermo couples having different characteristics, means for heating the thermo couples in accordance with a current to be determined and means for determining when the thermo couples develop equal thermal electromotive forces.

4. A measuring device comprising two thermo couples having different characteristics, a conductor traversed by the current to be determined adapted to heat the thermo couples and means for determining when the thermo couples develop equal thermal electromotive forces.

5. A measuring device comprising two thermo couples having different characteristics, a conductor traversed by the current to be determined adapted to heat the thermo couples and a galvanometer for indicating when the thermo couples develop equal thermal electromotive forces.

6. A measuring device comprising an air-evacuated member, a conductor therein traversed by the current to be determined, two thermo couples disposed adjacent to the conductor and an indicating instrument connected in series with the thermo couples for indicating when the thermal electromotive forces thereof are equal.

7. A measuring device comprising a heater member, a plurality of thermo couples having different thermal characteristics, a casing for the heater member and the thermo couples and a galvanometer connected in series with the thermo couples for indicating a balanced condition therebetween.

8. The method of determining when a predetermined current traverses a conductor which consists in subjecting two dissimilar thermo couples to the heat dissipated by the conductor and observing when the thermo couples develop equal thermal electromotive forces.

In testimony whereof I have hereunto subscribed my name this 29th day of Jan., 1918.

CHESTER T. ALLCUTT.